United States Patent [19]

Lai et al.

[11] Patent Number: 5,346,732

[45] Date of Patent: Sep. 13, 1994

[54] PERFORMANCE SUPER HIGH FLOW ETHYLENE POLYMER COMPOSITIONS

[75] Inventors: Shih-Yaw Lai, Sugar Land; Lonnie G. Hazlitt; Pak-Wing S. Chum, both of Lake Jackson, all of Tex.

[73] Assignee: The Dow Chemical Company, Midland, Mich.

[21] Appl. No.: 924,775

[22] Filed: Aug. 4, 1992

[51] Int. Cl.$^5$ .............................................. B29D 22/00
[52] U.S. Cl. .................................. 428/35.7; 525/240; 526/348.2; 526/348.6; 526/352.2
[58] Field of Search ...................... 525/240; 526/348.2, 526/348.6, 352, 352.2; 428/35.7

[56] References Cited

U.S. PATENT DOCUMENTS

| | | | |
|---|---|---|---|
| 4,076,698 | 2/1978 | Anderson et al. | 526/348.6 |
| 4,192,935 | 3/1980 | Lovell et al. | 526/348.6 |
| 4,230,831 | 10/1980 | Sakurai et al. | 525/240 |
| 4,294,794 | 10/1981 | Lovell et al. | 264/328.1 |
| 4,617,352 | 10/1992 | Page et al. | 525/240 |
| 4,672,096 | 6/1987 | Nowlin | 526/116 |
| 4,705,829 | 11/1987 | Kwack et al. | 525/240 |
| 5,015,511 | 5/1991 | Treybig et al. | 428/34.1 |

FOREIGN PATENT DOCUMENTS

| | | |
|---|---|---|
| 0342032 | 11/1989 | European Pat. Off. ..... C08F 210/02 |
| 0350339A2 | 1/1990 | European Pat. Off. . |
| 0435624A1 | 7/1991 | European Pat. Off. . |
| 0492656A1 | 7/1992 | European Pat. Off. . |

OTHER PUBLICATIONS

"Injection Moulding" by D. H. Morton-Jones, in *Polymer Processing*, 1989 pp. 146–175.

"Injection Moulded Thin Walled Containers-Polypropylene Fills the Need" by M. Ball and C. N. Main in *Society of Plastic Engineering Inc., 37th Annual Conference*, pp. 89–92 (1979).

"The Use of Polypropylene for Thin Walled Container Manufacture" by S. D. J. Dagniave and K. G. Moxom in *Society of Plastic Engineering Inc., 35th Annual Conference*, pp. 61–63 (1977).

Modern Plastics International, p. 81 (Aug. 1983).

"Polyolefin Thinwalling: Big News Again in Injection Molded Food Containers" by Robert D. Leaversuch in *Modern Plastics*, pp. 46–49 (Jun. 1990).

*Primary Examiner*—George F. Lesmes
*Assistant Examiner*—Chris Raimund

[57] ABSTRACT

Super high flow ethylene polymer compositions comprising at least one linear ethylene polymer are disclosed which have improved processability for use in making thermally formed articles (e.g., thin-walled lids, cups and containers). The compositions have a processing index from about 0.005 KPoise to about 1 KPoise and are particularly useful in thermal forming processes having shear rates of at least 2,000 sec$^{-1}$ (e.g., injection molding processes). The compositions can be used to make thin-walled lids and cups and have good environmental stress crack resistance and Gullwing Tear properties.

3 Claims, 1 Drawing Sheet

PERFORMANCE SUPER HIGH FLOW ETHYLENE POLYMER COMPOSITIONS

FIELD OF THE INVENTION

This invention relates to ethylene polymer compositions having improved processing. The compositions comprise at least one linear ethylene polymer having a density from about 0.87 to 0.965 grams/cubic centimeter, a melt index ($I_2$) from about 0.1 to about 2 grams/10 minutes, a melt index ($I_{10}$) from about 28 to about 55 grams/10 minutes, a melt flow ratio ($I_{10}/I_2$) from about 14 to about 550, and a processing index (PI) from about 0.005 Kpoise to about 1 Kpoise. The compositions are especially useful in making thermally formed articles such as thin-walled lids and cups.

BACKGROUND OF THE INVENTION

It has been believed that the injection molding of thinwalling articles by numerous different olefinic polymers and/or blends required the use of polymers having both (1) a very high melt index ($I_2$) (e.g., $I_2$ of greater than about 30 grams/10 minutes, usually about 100 grams/10 minutes) in order to fill a multiple cavity mold and thus reduce the cycle time, as in contrast to the use of very low $I_2$ (less than about 2 grams/10 minutes) resins, and (2) a narrow molecular weight distribution (indicated by a low value of weight average molecular weight divided by number average molecular weight ($M_w/M_n$), as opposed to broad molecular weight distribution, in order to obtain the best molded article.

For example, Modern Plastics International, p. 81 (August, 1983) discloses that the "super high flow" polyethylene resins having a melt index ($I_2$) of 100 grams/10 minutes and higher can reduce the cycle time for thinwalling injection molding applications.

Modern Plastics, pp. 46–49 (June 1990), discloses that both The Dow Chemical Company and Occidental Chemical Co. are capable of making "asymmetrical shaped" high density polyethylene (HDPE) resins. Dow's asymmetrical shaped resins are said to process like a resin having $I_2$ of 100 grams/10 minutes, yet retain physical properties like a resin having $I_2$ of 40 grams/10 minutes.

U.S. Pat. Nos. 4,192,935 and 4,294,794, incorporated herein by reference, each disclose an olefinic copolymer having a density of 0.940–0.960 grams/cubic centimeter, a melt index in the range of 100–200 grams/10 minutes, and a $M_w/M_n$ ratio of less than 5 for use in injection molding of thinwalling articles.

U.S. Pat. No. 5,015,511 (Treybig et al), incorporated herein by reference, discloses olefinic polymers having a melt index in the range of 80–200 grams/10 minutes, melt flow ratio ($I_{10}/I_2$) in the range of 7.2 to 14, a $M_w/M_n$ ratio in the range of 6.7–14.6 and a density in the range of 0.925 to 0.940 grams/cubic centimeter which are used for injection molding of thin walled containers with a thickness in the range of 0.15 mm to 1.5 mm.

It has now been discovered that certain types of articles can be successfully prepared by injection molding of olefinic polymers and virgin polymers/recycled polymer blends having: (1) a melt index ($I_2$) from about 0.1 to about 2 grams/10 minutes and, (2) extremely broad molecular weight distributions (high $M_w/M_n$ ratios and high $I_{10}/I_2$ ratios) with very strong mechanical properties.

SUMMARY OF THE INVENTION

We have now found super high flow ethylene polymer compositions comprising at least one linear ethylene polymer which have improved processability for use in making thermally formed articles (e.g., thin-walled lids, cups and containers). The compositions have a processing index from about 0.005 KPoise to about 1 KPoise and are particularly useful in thermal forming processes having shear rates of at least 2,000 sec$^{-1}$ (e.g., injection molding processes). The compositions comprise at least one linear ethylene polymer and can comprise a polymer blend. The polymer blends can comprise linear ethylene polymers blended with at least one other linear ethylene polymer, and include recycled linear ethylene polymers. The compositions can be used to make thin-walled lids and cups and have good environmental stress crack resistance and Gullwing Tear properties.

The compositions comprise linear ethylene polymers or polymer blends having:
a) a density from about 0.87 to 0.965 grams/cubic centimeter, especially from about 0.92 to about 0.96 grams/cubic centimeter,
b) a $I_2$ melt index from about 0.1 grams/10 minutes to about 2 grams/10 minutes,
c) a $I_{10}$ melt index from about 28 grams/10 minutes to about 55 grams/10 minutes,
d) a melt flow ratio ($I_{10}/I_2$) from about 14 to about 550, and
e) a processing index (PI) from about 0.005 Kpoise to about 1 Kpoise, preferably from about 0.005 Kpoise to about 0.2 Kpoise.

The thermally formed articles have improvements in physical properties such as environmental stress crack resistance, and Gullwing tear resistance.

DETAILED DESCRIPTION OF THE INVENTION

Figure 1:
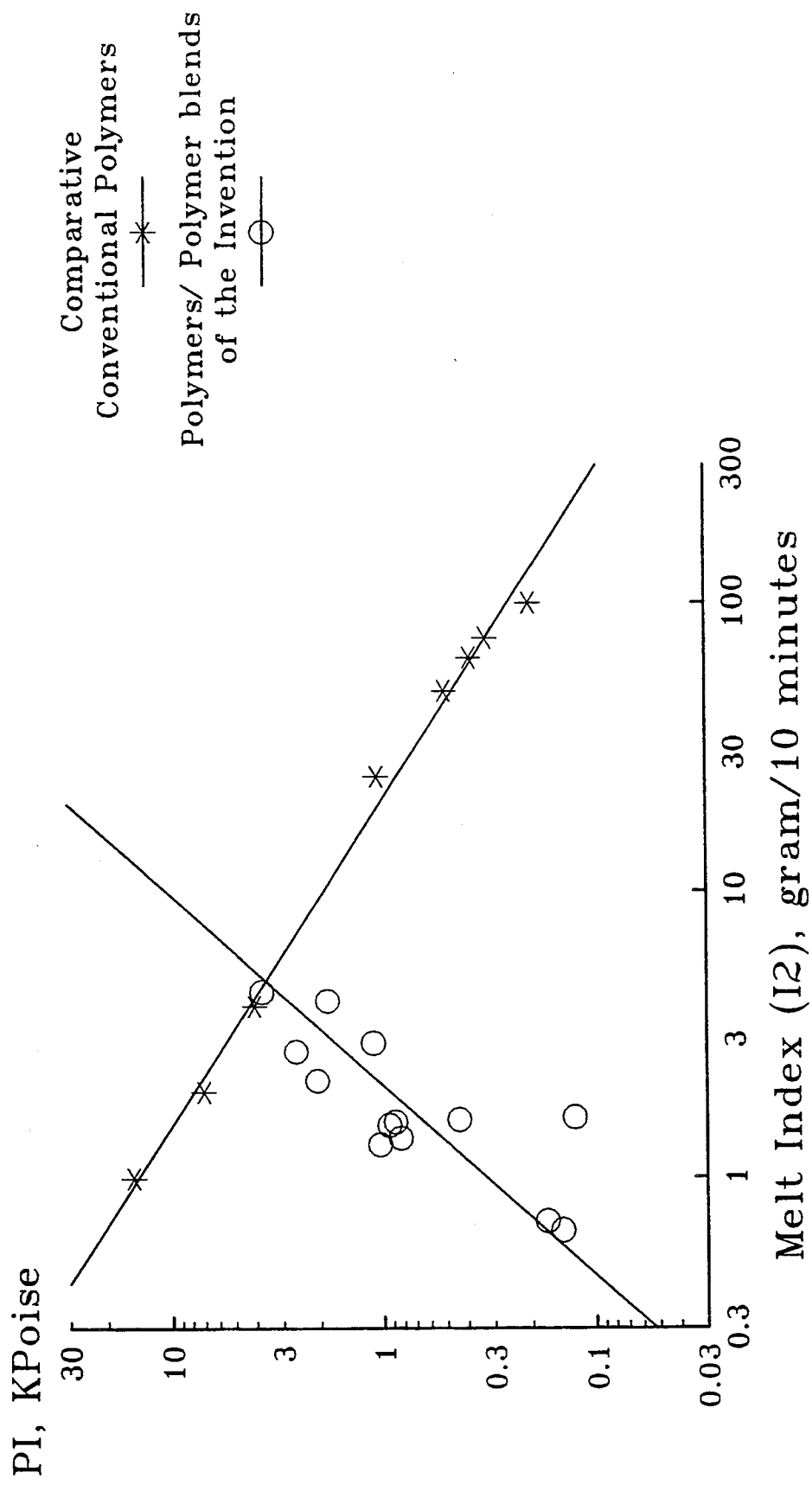
FIG. 1 plots processing index versus melt index ($I_2$) for some of the ethylene polymer compositions of the invention and for comparative conventional linear low density polyethylene polymers.

The compositions useful in this invention are ethylene polymer compositions and comprise at least one ethylene polymer classified as a linear ethylene polymer. There are several ways to manufacture the linear ethylene polymers for use in this invention. For example, U.S. Pat. No. 4,076,698 (Anderson et al.), incorporated herein by reference, involves the use of coordination catalysts of the "Ziegler" or "Phillips" type and includes variations of the Ziegler type, such as the "Natta" type for making linear polyethylenes. These catalysts may be used at very high pressures, but may also (and generally are) used at very low or intermediate pressures. Other manufacturing techniques are disclosed variously in U.S. Pat. No. 2,699,457; U.S. Pat. No. 2,846,425; U.S. Pat. No. 2,862,917; U.S. Pat. No. 2,905,645; U.S. Pat. No. 3,058,963; and U.S. Pat. No. 4,668,752. The disclosures of all of these U.S. patents are incorporated herein by reference.

The polyethylene compositions may also be prepared by multiple reactor polymerization techniques, e.g., as disclosed in U.S. Pat. No. 3,914,342, incorporated herein by reference. For example, one reactor may polymerize the higher molecular weight fraction and another reactor may polymerize a lower molecular weight fraction of the composition. The reactors may be operated either in series or in parallel.

The products made by coordination catalysts are generally known as "linear" polyethylenes because of the substantial absence of branched chains of polymerized monomer units pendant from the main polymer "backbone." It is these linear polyethylenes to which the present invention primarily pertains. Linear low density polyethylene (LLDPE) and ultra linear low density polyethylene (ULDPE) typically have a density from about 0.87 grams/cubic centimeter (g/cm$^3$) to about 0.94 g/cm$^3$, while linear high density polyethylene (HDPE) has a density from about 0.941 g/cm$^3$ to about 0.965 g/cm$^3$ (i.e., ethylene homopolymer). The terms "linear polyethylene" or "linear ethylene polymer", used interchangeably herein, mean either ULDPE, LLDPE, or HDPE, or mixtures of one or more of each of these.

The density of the linear polyethylene, as measured by ASTM D-792, is lowered by copolymerizing ethylene with minor amounts of at least one alpha-, beta-ethylenically unsaturated alkene(s) having from 3 to 18 carbons per alkene molecule (e.g., 1-propene, 1butene, 4-methyl-1-pentene, 1-hexene, 1-octene, 1,9-decadiene and 1,7octadiene), preferably 4–8 carbon atoms (e.g., 1-butene, 4-methyl-1pentene, 1-hexene and 1-octene) and most preferably 8 carbon atoms (i.e., 1-octene). The density of the linear polyethylene (or blend of linear polyethylenes) for use in the present invention is generally from about 0.87 g/cm$^3$ to about 0.965 g/cm$^3$, preferably from about 0.92 g/cm$^3$ to about 0.96 g/cm$^3$, and especially from about 0.905 g/cm$^3$ to about 0.955 g/cm$^3$. Generally, the amount of the "virgin" linear polyethylene is from about 5 percent to about 60 percent, by weight of the polymer blend, preferably about 10 percent to about 25 percent. The term "virgin" polyethylene, as used herein indicates that the polyethylene has undergone no more thermal processing than is typically necessarily used to manufacture that polyethylene (i.e., it is not a recycled polyethylene).

The molecular weight of the linear polyethylene (or blend of linear polyethylenes) for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear polyethylenes used herein is generally from about 0.1 grams/10 minutes (g/10 min) to about 2 g/10 min, preferably from about 0.2 g/10 min to about 1.5 g/10 min, and especially from about 0.4 g/10 min to about 0.8 g/10 min.

Another indication of the molecular weight of the polymer or polymer blend is by "$I_{10}$", measured in accordance with ASTM D-1238 (190° C./10 kg) (formerly Condition (N). The $I_{10}$ melt index for the linear polyethylenes used herein is generally from about 28 grams/10 minutes (g/10 min) to about 55 g/ 10 min, preferably from about 28 g/10 min to about 50 g/10 min, and especially from about 28 g/10 min to about 5 g/10 min.

The ratio of $I_{10}/I_2$ is called the melt flow ratio and is generally from about 14 to about 550 for the polymers and polymer blends used herein, preferably from about 28 to about 100, and especially from about 40 to about 50.

The recycled polyethylene is generally a polyethylene which has been recycled from molded bottles (e.g., those made from a blow molding process). This type of polyethylene is usually a high density polyethylene, typically having a density from about 0.94 g/cm$^3$ to about 0.96 g/cm$^3$, a melt index ($I_2$) from about 0.3 g/10 min to about 1.5 g/10 min and $I_{10}$ melt index from about 3.5 g/10 min to about 20 g/10 min. The recycled HDPE also generally has a melt flow ratio from about 0.2 to about 5. Other recycled polyethylenes (e.g., recycled LLDPE from film) are also believed to be operable within this invention, but the resultant composition needs to have the properties specified for the overall composition, as Applicants have discovered.

Additives such as antioxidants, cling additives (e.g., polyisobutylene or PIB), antiblock additives, pigments, and the like can also be included in the compositions, to the extent that they do not interfere with the enhanced processing and physical properties discovered by Applicants.

The compositions disclosed herein are formed by any convenient method, including dry blending the individual components and subsequently melt mixing, either directly in the extruder used to make the thermally molded article, or by pre-melt mixing in separate extruder before making the article. The compositions may also be prepared by dual polymerization techniques. For example, one reactor may polymerize one of the linear ethylene polymers and another reactor polymerize at least one other linear ethylene polymer, either in series or in parallel operation. Preferably, however, the compositions are made by dry blending discrete polymers having the specified properties in appropriate weight ratios.

Thermally formed articles which particularly benefit from the improved processing compositions described herein include, but are not limited to, thin walled lids (especially those having a thickness from about 0.02 inches to about 0.05 inches), molded containers and molded cups. Thin walled lids have shown particular utility, as shown herein. The thermally formed articles can be made by any convenient molding method, including various injection molding processes (e.g., that described in *Modern Plastics Encyclopedia/89*, Mid October Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia/89*, Mid October Issue, Volume 65, Number 11, pp. 217–218, "Extrusion-Blow Molding", the disclosure of which is incorporated herein by reference).

The rheological processing index (PI) is measured by a gas extrusion rheometer (GER). The GER is described by M. Shida, R. N. Shroff and L. V. Cancio in Polym. Eng. Sci., Vol. 17, no. 11, p. 770 (1977), and in "Rheometers for Molten Plastics" by John Dealy, published by Van Nostrand Reinhold Co. (1982) on page 97–99, the disclosures of both of which are incorporated herein by reference. The processing index is measured at a temperature of 190° C., at nitrogen pressure of 2500 psig using 0.0296 inch diameter, 20:1 L/D die. The GER processing index is calculated in millipoise units from the following equation:

$$PI = 2.15 \times 10^6 \text{ dynes/cm}^2/(1000 \times \text{shear rate}),$$

where: $2.15 \times 10^6$ dynes/cm$^2$ is the shear stress at 2500 psi, and the shear rate is the shear rate at the wall as represented by the following equation: $((32)(Q'))/((60 \text{ sec/min})(0.745)(\text{Diameter} \times 2.54 \text{ cm/in})^3)$ where:

Q' is the extrusion rate (gms/min), 0.745 is the melt density of polyethylene (gm/cm$^3$), and Diameter is the orifice diameter of the capillary (inches).

The PI is the apparent viscosity of a material measured at apparent shear stress of $2.15 \times 10^6$ dyne/cm$^2$.

The most unique characteristic of the polymer compositions described herein is a highly unexpected flow property as shown in FIG. 1, where, as the melt index is lowered, the Processing Index is also decreased for the compositions of the present invention. This direct proportional relationship is highly unexpected, since prior literature publications teach lowering the PI by increasing the melt index of a given polymer (i.e., an inversely proportional relationship demonstrated by the comparative polymer also depicted in FIG. 1). The super high flow ethylene polymer compositions described herein thus have low processing indices and consequently, low viscosity. The thermally formed articles benefit the most from using the compositions described herein by using extrusion techniques which involve shear rates of at least about 2,000 sec$^{-1}$, preferably from about 10,000 sec$^{-1}$ to about 20,000 sec$^{-1}$.

Gullwing Tear determines the tear resistance of flexible plastic sheeting at very low rates of loading (2 inches/minute) and is tested in accordance with ASTM D-1004. The test is designed to measure the force to initiate tearing. Specimen geometry produces a stress concentration in a small area of the specimen. Specimens were cut from the center of injection molded lids (dimension 2 inches (length) by 0.5 inches (width) by 0.024 inches (thickness)). Gullwing Tear is measured by using an Instron Tensile Tester equipped with an integrator and a recorder. An injection molded lid sample (thickness of about 22–24 mils) of the polymer to be tested is prepared. Five samples are cut into "Gullwing" shaped test samples, one sample from the center of each injection molded lid, molded as described in Example 1. The specimens are conditioned in the laboratory at about 23° C. and about 50 percent relative humidity for 40 hours before testing. For these tests, the crosshead speed is about 2 inches/minute and the Instron jaws are 2 inches apart at the test start. The thickness of each specimen is measured in the area that tear resistance is to be measured. After complete rupture of the specimen, the maximum tearing load is recorded in pounds-force/inch of specimen thickness.

Environmental stress crack resistance (ESCR) is measured in accordance with ASTM D-1693. ESCR measures the resistance to stress cracking of polyethylene under specified conditions. As in the Gullwing tear test, 22–24 mils thick samples of injection molded lids of the polymer to be tested are prepared. At least 10 specimens (1.5 inches by 0.5 inches) are die cut from the sheet. Solutions of 0.5%, 10% and 33.33% (by weight of the solution) Igepal ™ CO-630 (an alkylphenoxypoly(oxyethylene) ethanol biodegradable surfactant sold by GAF Corporation) in water are prepared as the stress cracking agents about 24 hours before use. Each specimen is "nicked" by gouging a 0.02 inch deep, 0.75 inch long controlled imperfection in the broad surface of each specimen. The ten specimens are placed slitted side up in a bending clamp, which operates to close or bend the sample at a uniform rate such that the clamp is completely closed in 30 seconds. The specimens are then placed in a specimen holding channel, which is then placed in a test tube, which is subsequently filled with the selected Igepal/water solution. Within 10 minutes from bending, the test tubes are placed into 50° C. controlled water baths and the time noted. Stress crack failure is any crack which is visible to the naked eye. The number of failures per 10 specimens is periodically noted and recorded. (Note: an extension of the controlled slit imperfection is not considered to be a stress crack/failure). The time at which 50% (on average) of the specimens under test would be expected to fail is noted as the environmental stress crack resistance for that particular stress crack solution agent.

Improvements of processability over the resins with similar $I_2$ are most pronounced when the PI is lower than about 0.5 Kpoise. Improvements of mechanical properties such as ESCR and Gullwing Tear, over a resin with a similar PI are most pronounced when the $I_2$ is less than about 1 gram/10 min. and when the $I_{10}$ is lower than about 40 grams/10 min.

EXAMPLE 1

Polymer sample #1 and comparison polymer sample #2 with similar $I_2$ (Table I) are injection molded into thinwalled lids of (0.025 inches in thickness) using a Husky XL225P, two stage, high speed injection molding machine. Extruder temperature is set at 550° F. or lower. Both samples are ethylene/1-octene copolymers. Sample #1 is successfully injection molded into lids at an injection pressure of 6385 psi, and a compression pressure of 4890 psi. Comparative Sample #2 cannot be injection molded by the same machinery at any molding conditions, and no injection molded part is obtained.

TABLE I

| Property | Sample #1 | Comparative Sample #2 |
|---|---|---|
| $I_2$ (g/10 min) | 0.66 | 0.6 |
| $I_{10}$ (g/10 min) | 32.15 | 4.5 |
| $I_{10}/I_2$ | 48.7 | 7.5 |
| Density (g/cm$^3$) | 0.941 | 0.925 |
| PI (Kpoise) | 0.127 | 18 |

Thus Sample #1 having $I_{10}/I_2$ of 48.7 can be successfully molded, whereas comparative Sample #2 having $I_{10}/I_2$ of 7.5 cannot be molded into lids, even though both samples have about the same $I_2$. Conventional comparative polymers having a low melt index cannot be successfully molded whereas polymers of the invention can be successfully molded even at fractional melt index.

EXAMPLE 2

Polymer sample #1 and comparative polymer sample #3 with similar processing index (Table II) injection molded into thinwalled lids of (0.025inches thick) using the Husky 225, as described earlier. Both samples are ethylene/1-octene copolymers. Extruder temperature is set at 530° F. Both sample #1 and comparative sample #3 are successfully injection molded into thinwall lids. Sample #1 is 10 molded at an injection pressure of 6385 psi, and a compression pressure of 4890 psi. Comparative sample #3 is extruded at slightly lower temperature (460 ° F.), a similar injection pressure of 6271 psi, and slightly higher compression pressure of 5877 psi.

The mechanical properties of the article molded by sample #1 performed better in the Gullwing and environmental stress cracking resistance (ESCR) than the article molded by comparative sample #3, as shown in Table II.

TABLE II

| Property | Sample #1 | Comparative Sample #3 |
| --- | --- | --- |
| I$_2$ (g/10 min) | 0.66 | 105 |
| I$_{10}$ (g/10 min) | 32.15 | >700 |
| I$_{10}$/I$_2$ | 48.7 | about 7 |
| PI (Kpoise) | 0.127 | 0.17 |
| ESCR* | 10 hours | 2 hours |
| Gullwing Tear (lbs./inch) | 660 | 468 |
| Density (g/cm$^3$) | 0.941 | 0.930 |

*10% Igepal in water

EXAMPLE 3

Polymer sample #4 and comparative polymer #5 are injection molded into thinwalled containers (0.03 inches thick, 800 cm$^3$ in volume) using the Husky 225, as described earlier. Extruder temperature is set at 560° F. Both samples are ethylene/1-octene copolymers. Sample #4 is successfully injection molded into thinwalled cups at the injection pressure of 6500 psi or lower, and a compression pressure of 4900 psi. A cup could not be made from comparative sample #5 at any adjustable injection molding condition by the same machine, again showing that conventional comparative polymers having low melt index cannot be molded into thin-walled containers. Table III shows the physical properties of Sample 4 and comparative sample 5:

TABLE III

| Property | Sample #4 | Comparative Sample #5 |
| --- | --- | --- |
| I$_2$ (g/10 min) | 0.71 | 1 |
| I$_{10}$ (g/10 min) | 29.32 | 8 |
| I$_{10}$/I$_2$ | 41.3 | 8 |
| PI (Kpoise) | 0.163 | 15 |
| Density (gm/cm$^3$) | 0.941 | 0.930 |

EXAMPLE 4

Sample #1 was blended with 0–75 percent (by weight of the final blend) of post-consumer recycled polyolefin sample #6 using a Haake System 90 blender at 180° C. and 100 rpm for 4 minutes. The processing results are shown in Table IV. The composition of sample #6 is believed to be a high density polyethylene (HDPE), having I$_2$ of about 2.5 grams/10 minutes, a density of about 0.95 grams/cm$^3$, and a melt flow ratio of about 9 with small amounts of pigment and impurities (e.g., that obtained from recycling blow molded bottles). The P.I. of the resulting blend showed considerably less than expected values from that expected from the additive law based upon the concentrations of each constituent. The synergistic effects of maintaining super high flow (P.I. <1 Kpoise) of a blend containing up to 50 percent (by weight) of a recycled polyethylene are unexpected. These blends, demonstrating a low PI, are thus suitable for high shear thermal forming application as we demonstrated in Example 1.

TABLE IV

| Measured PI of the blend (Kpoise) | Calculated PI of the blend (Kpoise) | weight percent sample #1 | weight percent sample #6 | I$_2$ of the blend (gms/10 min) |
| --- | --- | --- | --- | --- |
| 0.127 | 0.127 | 100 | 0 | 0.66 |
| 0.176 | 0.3583 | 90 | 10 | .754 |
| 0.360 | 0.7053 | 75 | 25 | .921 |
| 1.002 | 1.2835 | 50 | 50 | 1.285 |
| 2.120* | 1.862 | 25 | 75 | 1.792 |
| 2.440* | 2.44 | 0 | 100 | 2.5 |

*Comparative Example only; not an example of the invention

EXAMPLE 5

Various polymers and polymer blends of the present invention are processed according to the Processing Index test previously described. Surprisingly, the polymers and polymer blends of the invention have low PI as compared with conventional polymers, even if the invention polymers/polymer blends and the comparative polymers have the same (I$_2$) melt index. Table V lists the PI and I$_2$ melt index data for the polymers/polymer blends of the invention as well as for the comparative conventional polymers (the PI for the conventional polymer samples is an average). FIG. 1 graphically displays the data of Table V, with a best fit line drawn through the points (obtained using linear regression).

TABLE V

| Polymer | Melt Index (I$_2$) (gms/10 min) | PI (KPoise) |
| --- | --- | --- |
| A | 0.66 | 0.144 |
| B | 0.71 | 0.169 |
| C | 1.31 | 1.032 |
| D | 1.38 | 0.823 |
| E | 1.53 | 0.931 |
| F | 1.57 | 0.870 |
| G | 1.6 | 0.435 |
| H | 1.63 | 0.125 |
| I | 2.19 | 2.041 |
| J | 2.77 | 2.564 |
| K | 2.97 | 1.10 |
| L | 4.49 | 3.69 |
| M | 4.81 | 1.815 |
| N* | 1 | 15.0 |
| O* | 2 | 7.0 |
| P* | 4 | 4.1 |
| Q* | 25 | 1.05 |
| R* | 50 | 0.50 |
| S* | 65 | 0.38 |
| T* | 75.6 | 0.32 |
| U* | 100 | 0.20 |

*Comparative Example only; not an example of the invention

We claim:

1. A thermally formed article formed by extruding a composition comprising at least one linear ethylene polymer having:
   (a) a density from about 0.87 g/cm$^3$ to about 0.965 g/cm$^3$,
   (b) a melt index, I$_2$, as measured by ASTM D-1238 (190° C./2.16 kg), from about 0.1 grams/10 minutes to about 2 grams/10 minutes,
   (c) a melt index, I$_{10}$, as measured by ASTM D-1238 (190° C./10 kg), from about 28 grams/10 minutes to about 55 grams/10 minutes,
   (d) a melt flow ratio, I$_{10}$/I$_2$, from about 14 to about 550, and
   (e) a processing index from about 0.005 Kpoise to about 1 Kpoise.

2. The thermally formed article of claim 1, wherein the article is selected from the group consisting of thin walled lids, molded containers and cups.

3. The thermally formed article of claim 2 wherein the article is a thin walled lid having a thickness from about 0.02 inches to about 0.05 inches.

* * * * *